(12) United States Patent
Aneder (10) Patent No.: US 11,339,888 B2
(45) Date of Patent: May 24, 2022

(54) HYDRAULIC VALVE SYSTEM WITH A VALVE HOUSING AND METHOD FOR MANUFACTURING A VALVE HOUSING

(71) Applicant: HAWE Hydraulik SE, Aschheim (DE)

(72) Inventor: Georg Aneder, Emmering (DE)

(73) Assignee: HAWE Hydraulik SE, Aschheim (DE)

( * ) Notice: Subject to any disclaimer, the term of this patent is extended or adjusted under 35 U.S.C. 154(b) by 226 days.

(21) Appl. No.: 16/713,244

(22) Filed: Dec. 13, 2019

(65) Prior Publication Data
US 2020/0191292 A1 Jun. 18, 2020

(30) Foreign Application Priority Data

Dec. 13, 2018 (DE) ...................... 10 2018 221 689.4

(51) Int. Cl.
*F16K 27/02* (2006.01)
*B21D 53/10* (2006.01)
(52) U.S. Cl.
CPC .......... *F16K 27/0263* (2013.01); *B21D 53/10* (2013.01); *F15B 2211/30525* (2013.01); *Y10T 137/87885* (2015.04)
(58) Field of Classification Search
CPC ............. F16K 27/0263; F16K 27/0281; F16K 27/0291; B21D 53/10; F15B 2211/30525; F15B 2211/3058; F15B 2211/3053; F15B 2211/30535; F15B 2211/3054; F15B 2211/30545; F15B 2211/3055; F15B 2211/30555; F15B 2211/30585; F15B 2211/3056–30595; Y10T 137/87885; Y10T 137/5109; Y10T 137/86493–8671; B23B 5/06

USPC ........ 137/15.21, 315.11, 315.27, 269, 454.6, 137/884
See application file for complete search history.

(56) References Cited

U.S. PATENT DOCUMENTS 2,879,788 A 3/1959 Beckett
2,934,765 A * 4/1960 Carson ................ F15B 13/0438
137/625.61
(Continued)

FOREIGN PATENT DOCUMENTS

DE 3822340 A1 1/1989
DE 4305608 A1 8/1994
(Continued)

*Primary Examiner* — Craig J Price
(74) *Attorney, Agent, or Firm* — Dinsmore & Shohl LLP (57) ABSTRACT

A hydraulic valve system has a valve housing, which has a first connection side and a second connection side. The valve housing has a through-hole for accommodating at least one piston. The valve housing has a third connection side with at least three hydraulic connections which are each connected to the through-hole via a line. The hydraulic valve system has a connection block with at least three hydraulic through-lines each extending from a first connection opening arranged on a housing side of the connection block to at least one second connection opening arranged on a hole pattern side opposite the housing side. Each of the at least three first connection openings is connected in a fluid-tight manner to one of the at least three hydraulic connections, and the second connection openings are arranged in a pre-defined hole pattern. A method for manufacturing a valve housing is also disclosed.

18 Claims, 13 Drawing Sheets

(56) References Cited

U.S. PATENT DOCUMENTS

| | | | | |
|---|---|---|---|---|
| 3,036,433 | A * | 5/1962 | Loup | F15B 1/26 60/471 |
| 3,101,741 | A * | 8/1963 | Ludwig | F16K 11/07 137/625.6 |
| 3,215,158 | A * | 11/1965 | Bass, Jr. | F15B 13/08 137/269 |
| 3,339,572 | A * | 9/1967 | Gordon | F15B 13/0431 137/85 |
| 3,550,621 | A * | 12/1970 | Malinowski | F15B 13/0817 137/884 |
| 3,589,387 | A * | 6/1971 | Raymond | F15B 13/0817 137/261 |
| 3,635,249 | A * | 1/1972 | Kirkman | F15B 13/04 137/625.48 |
| 3,654,960 | A * | 4/1972 | Kiernan | F15B 13/0896 137/884 |
| 3,688,797 | A * | 9/1972 | Sorenson | F15B 13/0857 137/625.64 |
| 4,080,983 | A * | 3/1978 | Stumpmeier | F15B 13/0814 137/271 |
| 4,136,713 | A * | 1/1979 | Humphreys | F15B 13/0892 137/561 A |
| 4,170,214 | A | 10/1979 | Gill et al. | |
| 4,359,064 | A * | 11/1982 | Kimble | F15B 13/0817 137/269 |
| 4,726,393 | A * | 2/1988 | Herner | F15B 13/0402 137/269 |
| 4,842,020 | A * | 6/1989 | Tinholt | F15B 13/0405 137/625.26 |
| 4,928,730 | A * | 5/1990 | Ando | G05D 16/2013 137/554 |
| 5,234,033 | A * | 8/1993 | Stoll | F15B 13/0814 137/884 |
| 5,291,915 | A * | 3/1994 | Lukasczyk | F16K 27/029 137/82 |
| 5,400,821 | A * | 3/1995 | Ott | F15B 13/0402 137/614.2 |
| 5,447,176 | A * | 9/1995 | Asou | F15B 13/0402 137/596.18 |
| 5,975,134 | A * | 11/1999 | Schwelm | F15B 13/086 137/596.15 |
| 6,116,282 | A * | 9/2000 | Yamaji | F16K 27/003 137/884 |
| 6,189,571 | B1 * | 2/2001 | Hedlund | F15B 13/081 137/269 |
| 6,446,668 | B2 * | 9/2002 | Hedlund | F16K 11/0712 137/625.64 |
| 6,729,353 | B2 * | 5/2004 | Nguyen | F16K 27/003 137/884 |
| 6,990,999 | B2 * | 1/2006 | Patel | F15B 13/0814 137/596.16 |
| 6,997,348 | B2 | 2/2006 | Droppleman | |
| 7,048,002 | B2 * | 5/2006 | Hayashi | F15B 13/0814 137/560 |
| 7,828,015 | B2 * | 11/2010 | Albrecht | F16K 27/003 411/383 |
| 8,833,396 | B2 * | 9/2014 | Kato | F15B 13/0842 137/884 |
| 8,931,507 | B2 * | 1/2015 | Murakami | F16K 27/003 137/382 |
| 9,903,484 | B2 * | 2/2018 | Hatano | F15B 11/064 |
| 10,400,902 | B2 * | 9/2019 | Miyazoe | F16K 11/065 |
| 10,400,908 | B2 * | 9/2019 | Lucidera | F16K 11/0708 |

FOREIGN PATENT DOCUMENTS

| | | | |
|---|---|---|---|
| DE | 10014906 | A1 | 10/2001 |
| DE | 102008032729 | A1 * | 1/2010 ............ B22D 17/00 |
| EP | 0192037 | A2 | 8/1986 |
| GB | 1390297 | A | 4/1975 |
| GB | 2457473 | A | 8/2009 |
| JP | S48114129 | U | 12/1973 |
| JP | 2018165548 | A | 10/2018 |
| KR | 20110095263 | A | 8/2011 |
| WO | 2010071151 | A1 | 6/2010 |

* cited by examiner

HYDRAULIC VALVE SYSTEM WITH A VALVE HOUSING AND METHOD FOR MANUFACTURING A VALVE HOUSING

CROSS-REFERENCE TO RELATED APPLICATION

This application claims priority from German Application No. DE 10 2018 221 689.4 filed Dec. 13, 2018, the entire content of which is incorporated herein by reference.

FIELD OF THE INVENTION

The present invention relates to a hydraulic valve system with a valve housing and a method for manufacturing a valve housing.

BACKGROUND OF THE INVENTION

Such valve housings regularly have a first connection side and a second connection side opposite the first connection side. The first connection side has a first piston opening and the second connection side has a second piston opening. A through-hole for receiving at least one piston extends from the first piston opening to the second piston opening. Furthermore, such valve housings normally have a third connection side with at least three hydraulic connections, each of which is connected to the through-hole via a line.

A disadvantage of the well-known hydraulic valve systems is that they regularly have a relatively complex valve housing in order to be able to accommodate all channels or lines within the housing. Furthermore, the hydraulic connections of the known valve housings always have a pre-defined, particularly a standardized hole pattern, for example an NG6 hole pattern or an NG10 hole pattern, so that different valve housings have to be used for different hole patterns. This in turn means that the valve housings are regularly relatively heavy and are therefore unsuitable in particular for portable mobile hydraulic applications. In the sense of this application, a standardized hole pattern is to be understood as a hole pattern in accordance with DIN 24340 and ISO 4401. A pre-defined hole pattern in the sense of the application is a hole pattern which meets the special requirements of the hydraulic valve system. These can be standardized hole patterns in particular, but application-specific hole patterns are also conceivable.

SUMMARY OF THE INVENTION

Against this background it is the object of this invention to show a hydraulic valve system with a simplified valve housing.

The problem is solved with a hydraulic valve system as described herein. Advantageous further developments are also described.

The hydraulic valve system in accordance with the invention is characterised over the hydraulic valve systems known from the prior art in particular in that the hydraulic valve system has a connection block with at least three hydraulic through-lines. The hydraulic through-lines each extend from a first connection opening located on a housing side of the connection block to at least one second connection opening located on a hole pattern side opposite the housing side. Each of the at least three first connection openings is fluid-tightly connected to a respective one of the at least three hydraulic connections. The second connection openings on the hole pattern side are arranged in accordance with the invention in a pre-defined hole pattern.

The connection block is thus a kind of adapter with which the connection pattern of the hydraulic connections of the valve housing is translated into a pre-defined hole pattern. Consequently, a different hole pattern for the hydraulic valve system can be provided quickly and easily by selecting and replacing the connection block, respectively. In addition, this results in a standardized valve housing, which is compact and therefore lighter than the known valve housings. This in turn facilitates the use of the hydraulic valve system according to the invention in portable mobile hydraulic systems. The pre-defined hole patterns are in particular standardized hole patterns, wherein further hole patterns are of course also conceivable.

In particular, it is also advantageous if the valve housing has at least four hydraulic connections and thus at least four second connection openings are also provided in a pre-defined and, in particular, standardized hole pattern. These are regularly the P-connection, the T-connection and the A- and B-connections for the connection of hydraulic consumers. It is conceivable in this context that the valve housing is configured to accommodate at least one spool valve piston or at least one seat valve piston in the through-hole.

It is advantageous if the at least three hydraulic connections are arranged in a row. An arrangement in a row is an arrangement in which the hydraulic connections are all approximately arranged next to each other. It is conceivable, of course, that the hydraulic connections are slightly offset from each other. This results in a particularly compact valve housing, since the axial length required anyway is used to arrange the hydraulic connections. This allows the valve housing to be kept slim in the lateral or radial direction relative to the center axis of the through-hole. In this context, it is particularly advantageous if the center points of the hydraulic connections are located on a line parallel to the center axis of the through-hole.

In particular, it is useful if all hydraulic connections of the valve housing are only located on the third connection side. This allows the connection block to be easily fixed to the valve housing.

The valve housing expediently has an outer surface extending at least partially between the first connection side and the second connection side, wherein a cross-section perpendicular to the center axis of the through-hole in the region of the outer surface is substantially circular. Of course it is preferable that the third connection side is a flat surface to allow a fluid-tight connection between the hydraulic connections and the first connection openings. In the sense of the invention, however, this deviation from a complete circular form is to be understood as substantially circular.

In this context, it is also useful if the valve housing has a substantially cylindrical form. For the purposes of this application, a substantially cylindrical shape is to be understood to mean both a substantially circular cylindrical shape and a prism. This has the advantage that the valve housing can largely be manufactured by turning, which significantly reduces manufacturing and material costs.

It is advantageous if the through-hole is stepless. This simplifies the manufacture of the valve housing.

It is advantageous if the valve housing has a first axial flange and a second axial flange, wherein the first connection side is arranged on the first axial flange and wherein the second connection side is arranged on the second axial flange, wherein the first axial flange or the second axial flange has at least one attachment structure for fixing the connection block to the third connection side. It is particularly advantageous if the first axial flange and the second axial flange each have at least one attachment structure for fixing the connection block on the third connection side.

Alternatively, it is advantageous if the hydraulic valve system has at least one attachment bracket, wherein the valve housing has at least one recess for receiving the at least one attachment bracket to fix the connection block to the third connection side.

Preferably, the hydraulic valve system comprises at least one attachment screw which can be screwed into a threaded opening of the connection block, and wherein the at least one attachment screw fixes the valve housing to the connection block in a clamping and fluid-tight manner via the at least one attachment structure or the at least one attachment bracket.

The attachment structure or the attachment bracket can thus be used to detachably fix the connection block with its housing side to the third connection side in a simple and quick manner, so that a fluid-tight connection can be created between the hydraulic connections and the respective first connection openings.

It is also advantageous if the valve housing is made of one piece. A one-piece valve housing is easy and generally cheaper to manufacture than a multi-piece valve housing.

The connection block preferably has at least one additional connection opening, wherein the additional connection opening is connected to at least one hydraulic through-line. The additional connection opening can be connected, for example, to the hydraulic through-line for the supply of a hydraulic consumer, i.e. to the A- or B-connection, so that an additional hydraulic functional element, for example a manometer, can be connected to the additional connection opening. Of course, it is conceivable that the connection block has multiple additional connection openings, for example to provide hydraulic functional elements for the pump connection, i.e. the P-connection. It is particularly advantageous here if the at least one additional connection opening is arranged on a side surface of the connection block.

Furthermore, the problem is solved by a method for manufacturing a valve housing for a hydraulic valve system according to the invention according to claim 13.

The method according to the invention includes in particular the following steps: Providing a round steel, turning of the round steel and insertion of the through-hole, milling of the round steel and manufacturing of the third connection side, and insertion of the hydraulic connections. It is conceivable that the hydraulic connections are also provided during milling. Alternatively, the hydraulic connections can also be drilled. In addition, the milling can also be used to manufacture the attachment structures or recesses, for example. Further processing steps can also follow the steps according to the invention, in particular fine machining such as honing or surface treatment. A round steel in the sense of the invention should also be understood as a bar-shaped steel in the form of a prism.

It is advantageous if the round steel is cut to the required length before the providing or if it is provided as bar material. Depending on the type of lathe used, a turning can be carried out fast and simple.

A hydraulic valve system in the sense of the application also means that two individual hydraulic valves are connected to the connection block. In other words, the valve functions do not necessarily have to be performed by a single hydraulic valve, but the combination of several hydraulic valves is also conceivable. For example, four hydraulic seat valves can be combined to form a 4/3 directional poppet valve.

BRIEF DESCRIPTION OF THE SEVERAL VIEWS OF THE DRAWING

In the following, the invention is explained in more detail by means of embodiments shown in the figures, wherein.

DETAILED DESCRIPTION OF THE INVENTION

Figure 1:
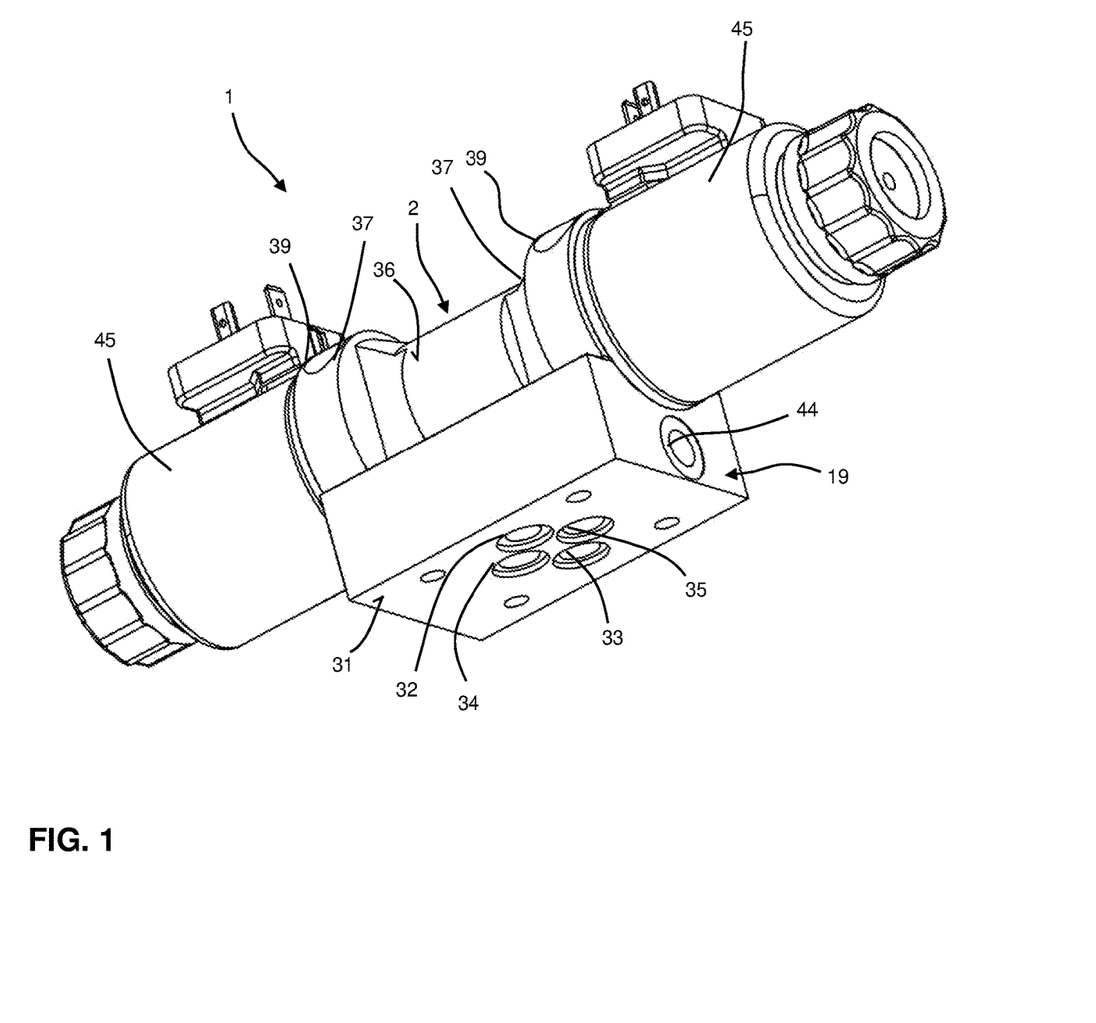
FIG. 1 shows a perspective view of a hydraulic valve system according to a first embodiment of the invention.
Figure 2:
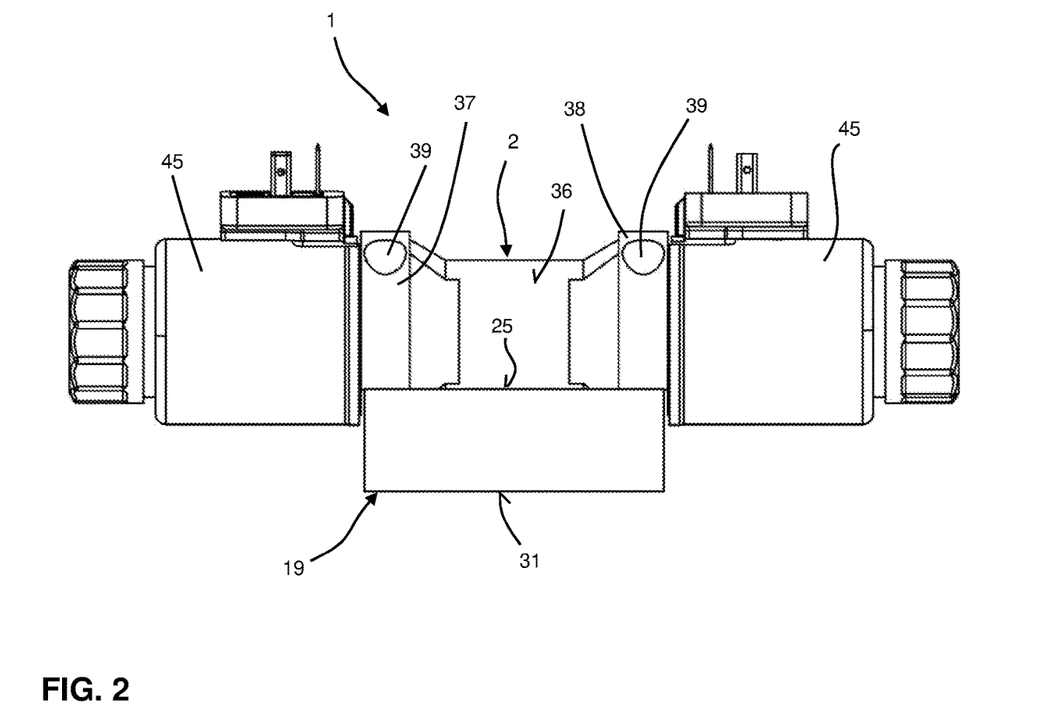
FIG. 2 shows a side view of the hydraulic valve system shown in FIG. 1.

FIGS. 1 and 2 show a hydraulic valve system 1 according to a first embodiment of the invention. The hydraulic valve system 1 has a one-piece valve housing 2, a connection block 19 fixed fluid-tightly to the valve housing 2 and two actuators 45. The actuators 45 are configured to move one or more pistons (not shown) arranged in valve housing 2 between different switching positions. In this embodiment, the actuators 45 are conventional electromagnetic actuators, so that the actuators 45 will not be discussed in detail in the following.

In the following, valve housing 2 according to the first embodiment is described with reference to FIGS. 3 to 9. The valve housing 2 has a first axial flange 37 with a first connection side 3 and a first piston opening 4 and a second axial flange 38 with a second connection side 5 and a second piston opening 6. From the first piston opening 4 to the second piston opening 6, a stepless through-hole 7 extends to accommodate the piston or pistons.

As shown, the first connection side 3 and the second connection side 5 are end faces of the valve housing 2. Between the first axial flange 37 and the second axial flange 38, an outer surface 36 extends so that the valve housing 2 as a whole has a substantially cylindrical shape. In addition, the cross-section through the area of the outer surface 36 is substantially circular, as can be seen from the sectional view shown in FIG. 9.

Figure 3:
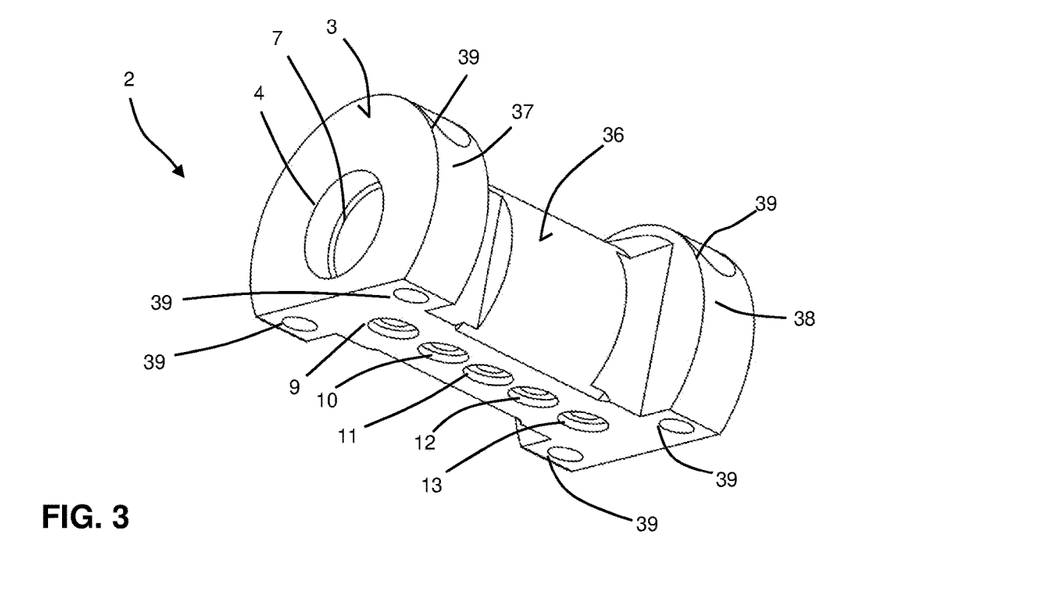
FIG. 3 shows a perspective view of the valve housing shown in FIG. 1.
Figure 4:
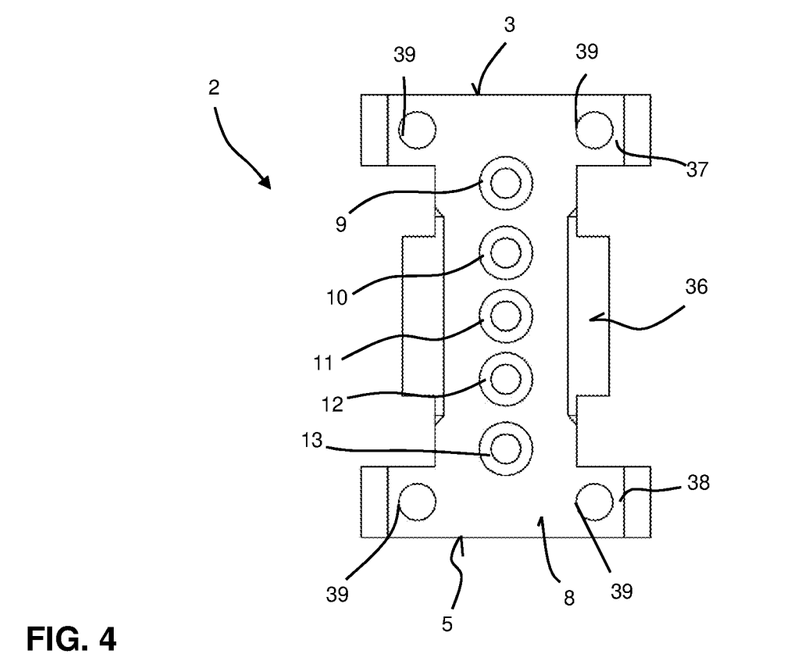
FIG. 4 shows a bottom view of the valve housing shown in FIG. 3.
Figure 5:
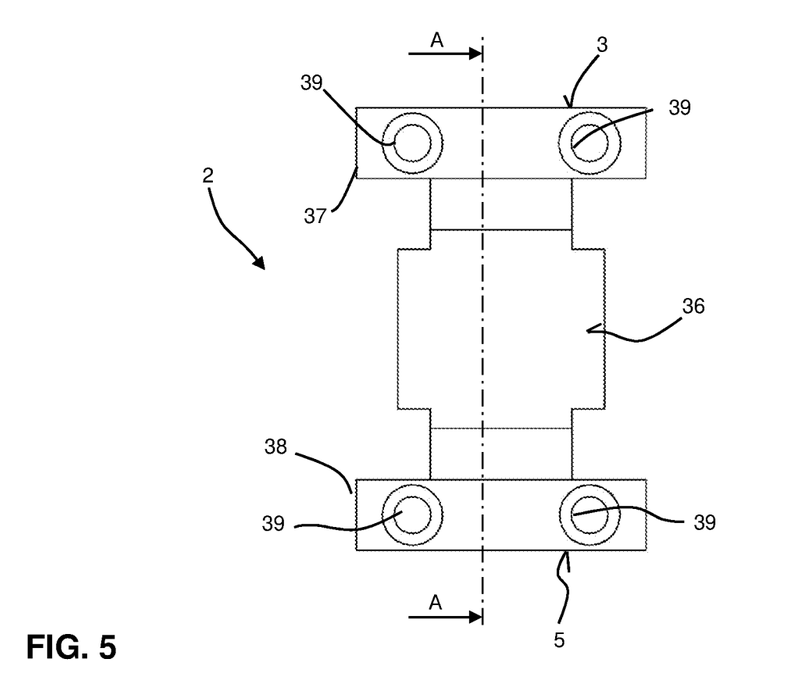
FIG. 5 shows a top view of the valve housing shown in FIG. 3.
Figure 6:
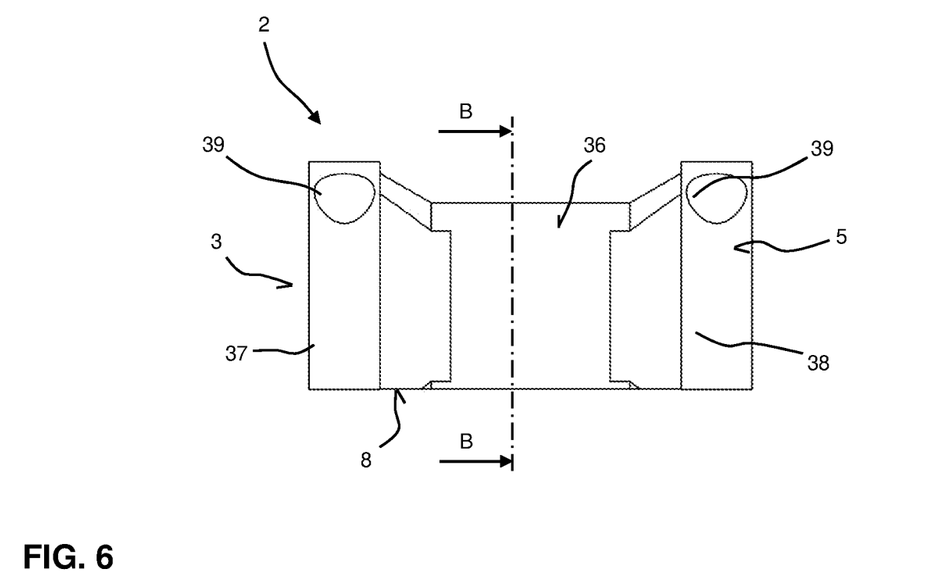
FIG. 6 shows a first side view of the valve housing shown in FIG. 3.
Figure 7:
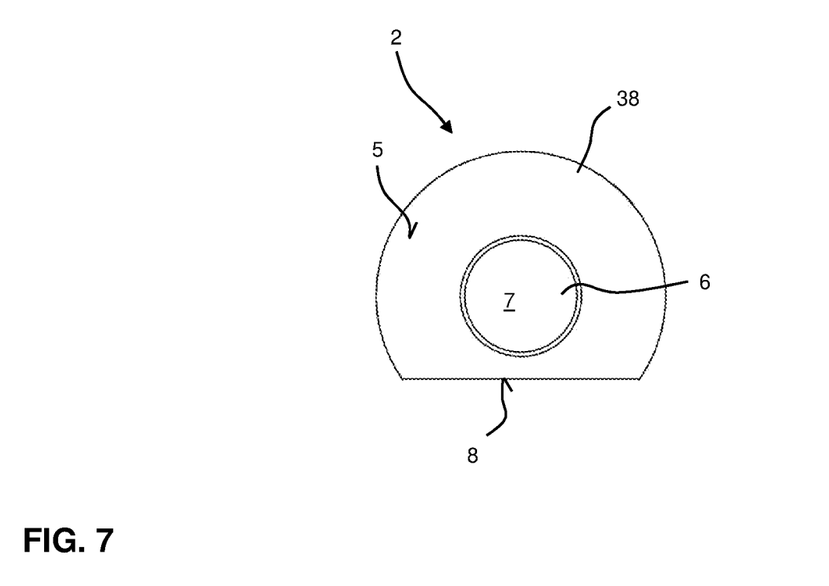
FIG. 7 shows a second side view of the valve housing shown in FIG. 3.
Figure 8:
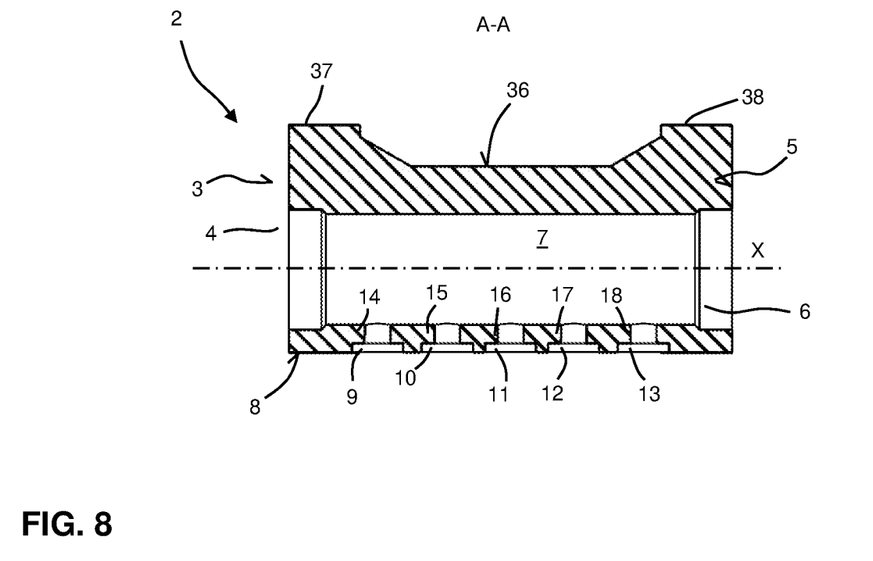
FIG. 8 shows a sectional view along the cut line A-A shown in FIG. 5.
Figure 9:
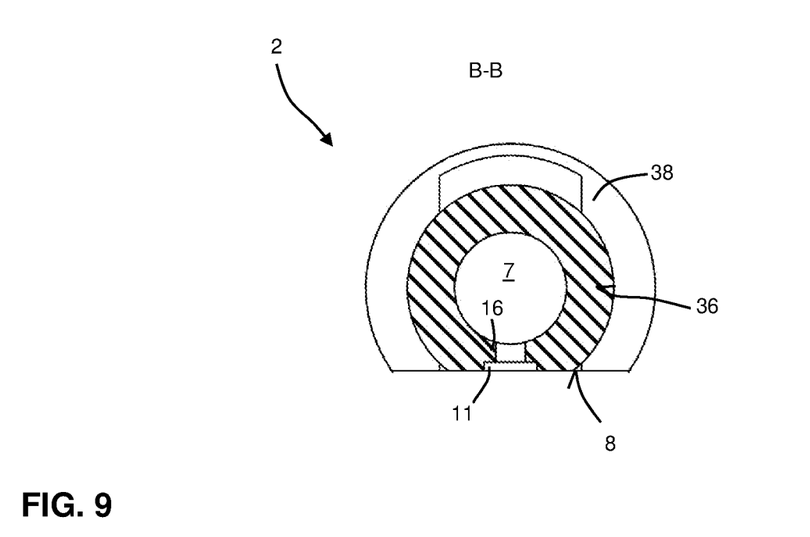
FIG. 9 shows a sectional view along the cut line B-B shown in FIG. 6.

As can be seen in particular in FIGS. 3 and 4, the valve housing 2 has a third connection side 8 with five hydraulic connections 9-13. The third connection side 8 is a flat surface extending from the first connection side 3 over the entire axial length of the valve housing 2 to the second connection side 5. As shown in the sectional view in FIG. 8, the five hydraulic connections 9-13 are each connected via a line 14-18 to the through-hole 7. The hydraulic connections 9-13 are arranged in a row along the third connection side 8, wherein the center points of the hydraulic connections 9-13 are located on a line which is parallel to the center axis X of the through-hole 7, as can be seen in particular in FIG. 8.

In this embodiment, the hydraulic connections include, for example, hydraulic connections 9, 13 for the pump, a hydraulic connection 11 for the return, a hydraulic connection 10 for a first hydraulic consumer A and a hydraulic connection 12 for a second hydraulic consumer B. It is therefore also conceivable, for example, that a total of four poppet valve pistons are used as pistons in order to realize a 4/3-directional poppet valve.

In addition, the valve housing 2 has two attachment structures 39 in the form of stepped holes on the first axial flange 37 and on the second axial flange 38 each. Each of the attachment structures 39 is configured to receive an attachment screw (not shown) which can each be screwed into a corresponding threaded opening 41 of the connection block 19 so as to fix the connection block 19 in a fluid-tight and clamping manner to the valve housing 2.

Figure 12:
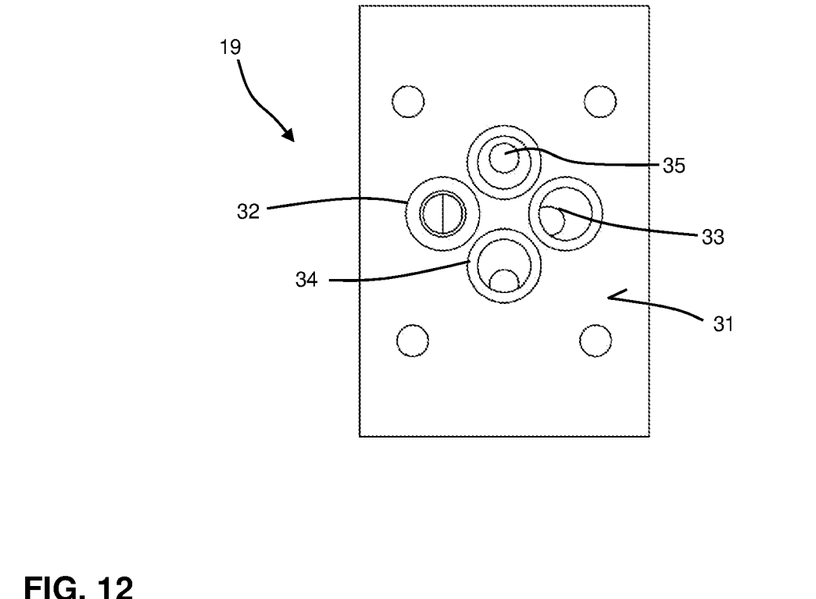
FIG. 12 shows a bottom view of the connection block shown in FIG. 10.
Figure 13:
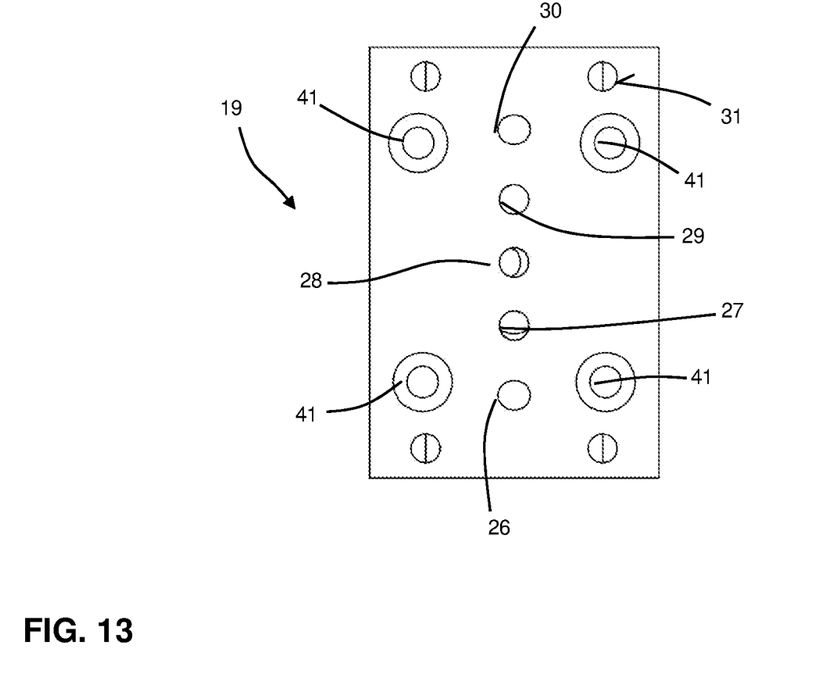
FIG. 13 shows a top view of the connection block shown in FIG. 10.
Figure 14:
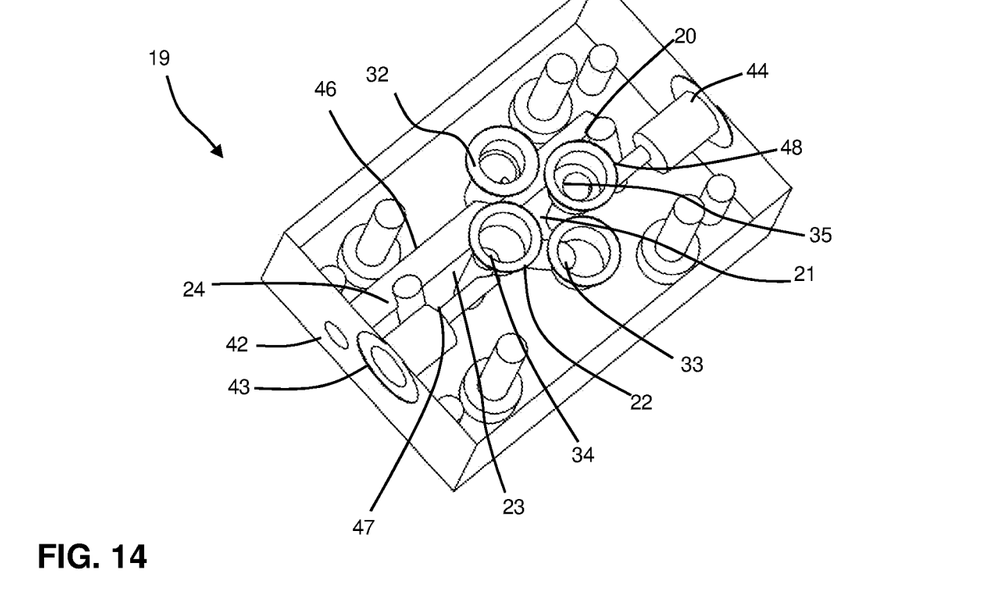
FIG. 14 shows a perspective view of the block shown in FIG. 10 with the hole pattern side removed.
Figure 15:
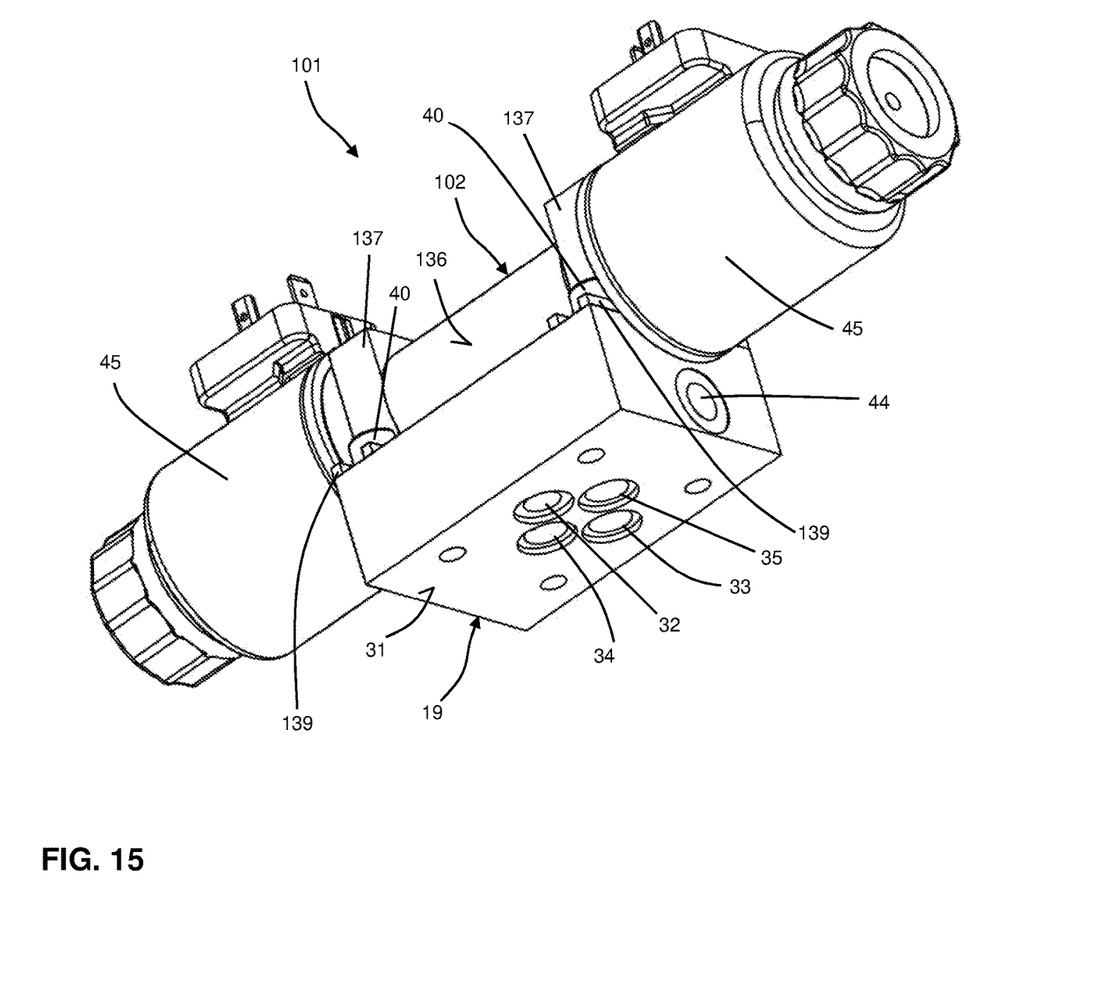
FIG. 15 shows a perspective view of a hydraulic valve system according to a second embodiment of the invention.

As shown in FIGS. 12 to 14, the connection block 19 is square with a housing side 25 and a hole pattern side 31 opposite the housing side 25. A total of five first connection openings 26-30 are arranged on the housing side 25. These five first connection openings 26-30 are arranged in a row on the housing side 25, so that respectively one of the first connection openings 26-30 is in fluid-tight connection with one of the hydraulic connections 9-13 when the connection block 19 is fixed to the valve housing 2.

Therefore the connection opening 26 of the first connection openings is connected to the hydraulic connection 9 and thus represents a connection for the pump. The connection opening 27 of the first connection openings is connected to the hydraulic connection 10 and thus represents a connection for the hydraulic consumer A. The connection opening 28 of the first connection openings is connected to the hydraulic connection 11 and thus represents the return. The connection opening 29 of the first connection openings is connected to the hydraulic connection 12 and thus represents a connection for the hydraulic consumer B. The connection opening 30 of the first connection openings is connected to the hydraulic connection 13 and thus represents a connection for the pump.

As shown in FIG. 14 the respective first connection openings 26-30 are connected via corresponding hydraulic through-lines 20-24 with second connection openings 32-35. In this embodiment, the second connection openings 32-35 are arranged on hole pattern side 31 in a standardized hole pattern. In the embodiment shown this is a NG6 hole pattern, wherein of course all other hole patterns are also possible. Connection block 19 is therefore a type of adapter which translates the hydraulic connections 9-13 of the valve housing 2, arranged in a row, into a standardized hole pattern. It is also conceivable, of course, that a non-standardized hole pattern is provided if this is required according to the requirements of hydraulic valve system 1.

Figure 10:
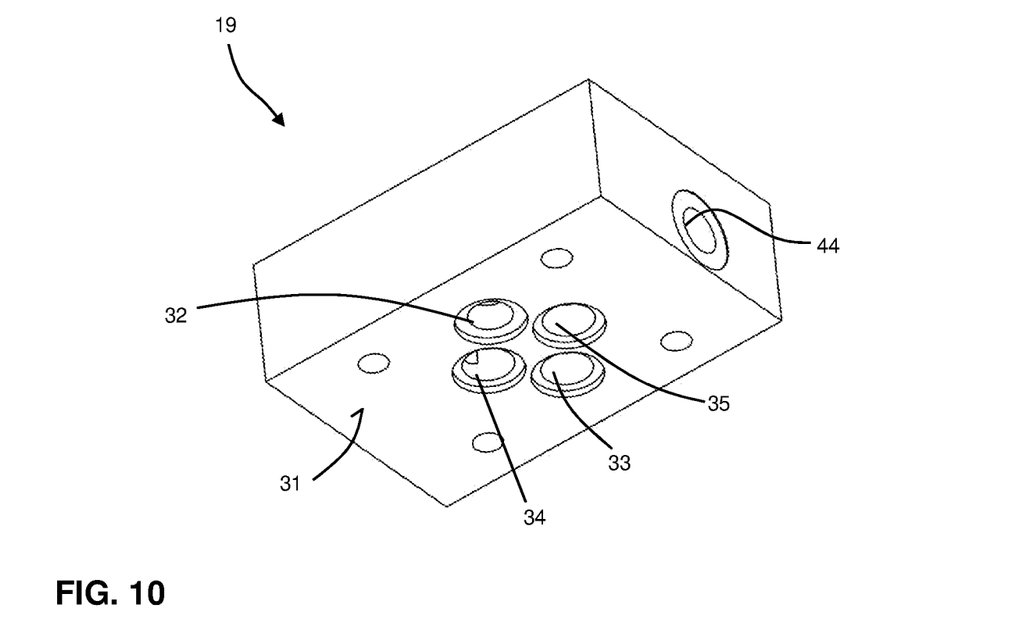
FIG. 10 shows a first perspective view of the connection block shown in FIG. 1.
Figure 11:
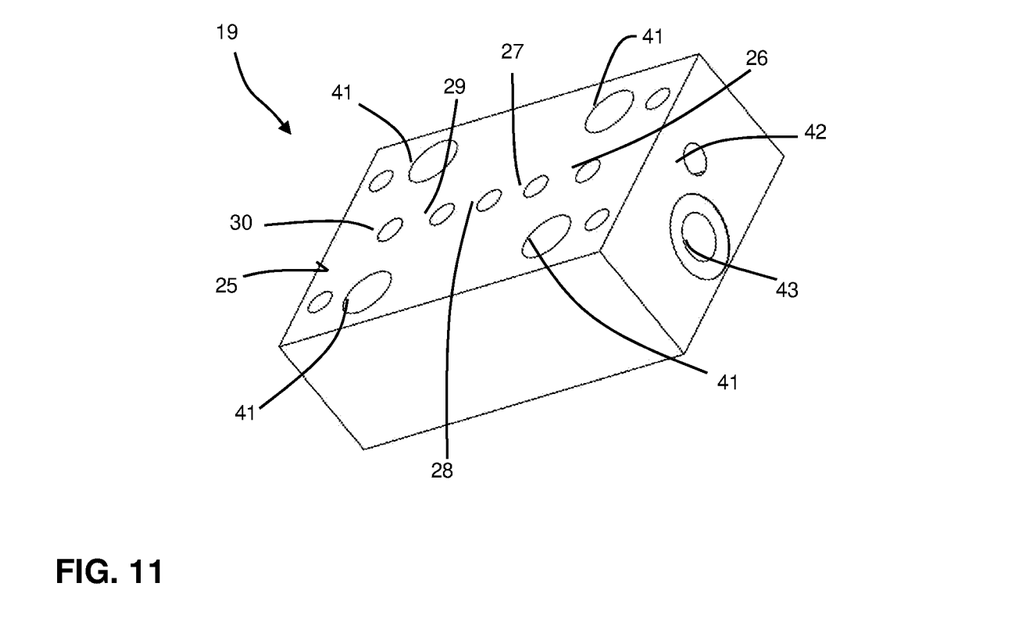
FIG. 11 shows a second perspective view of the connection block shown in FIG. 1.

In addition, connection block 19 has a total of three additional connection openings 42-44, which are arranged on the end faces of connection block 19. As shown in FIGS. 10, 11 and 14, an additional connection opening 42 for the pump or P-connection and an additional connection opening 43 for the hydraulic consumer A are arranged on one end face. These additional connection openings 42, 43 are connected to the hydraulic through-lines 20, 24 and 23, respectively, via corresponding channels 46, 47. On the end face opposite to this end face, an additional connection opening 44 for the hydraulic consumer B is arranged, which is connected to the hydraulic through-line 21 via a channel 48. Additional hydraulic functional elements, such as manometers or pressure switches, can be connected to these additional connection openings 42-44.

Below, with reference to FIGS. 15 to 23, a hydraulic valve system 101 according to a second embodiment of the invention is described. The hydraulic valve system 101 of the second embodiment also has a cylindrical valve housing 102 with a circular cross-section, see FIGS. 20 and 22.

Figure 16:
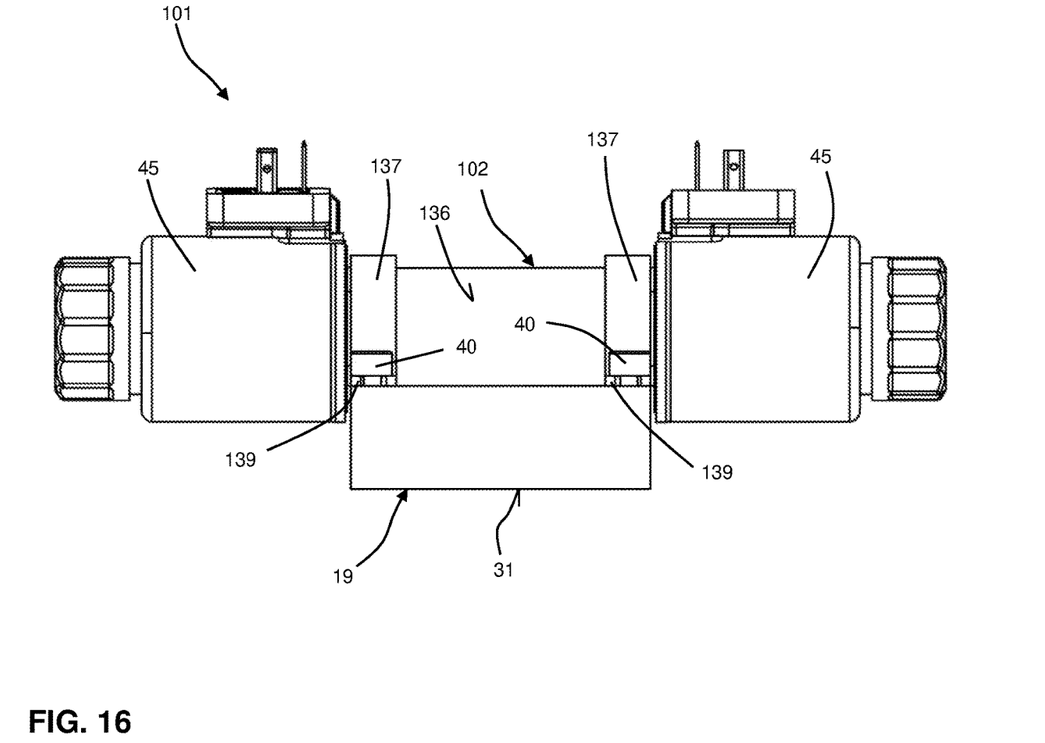
FIG. 16 shows a side view of the hydraulic valve system shown in FIG. 15.
Figure 17:
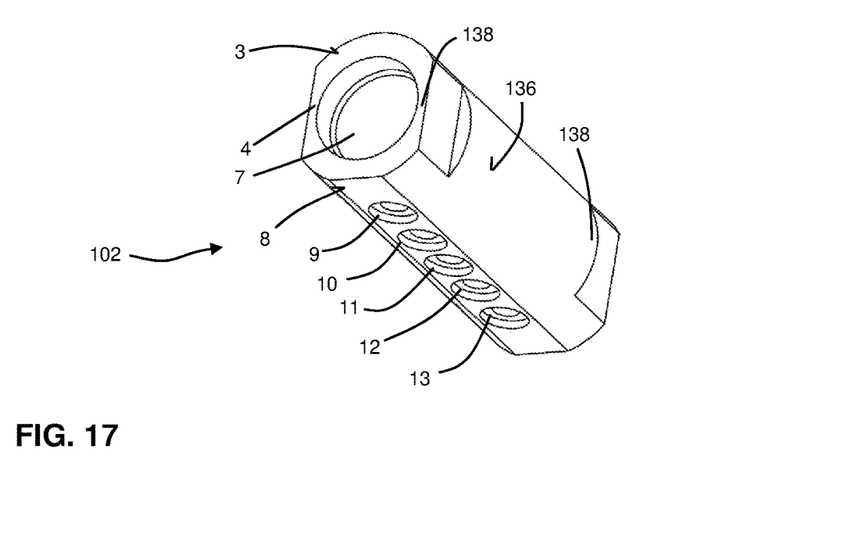
FIG. 17 shows a perspective view of the valve housing shown in FIG. 15.
Figure 18:
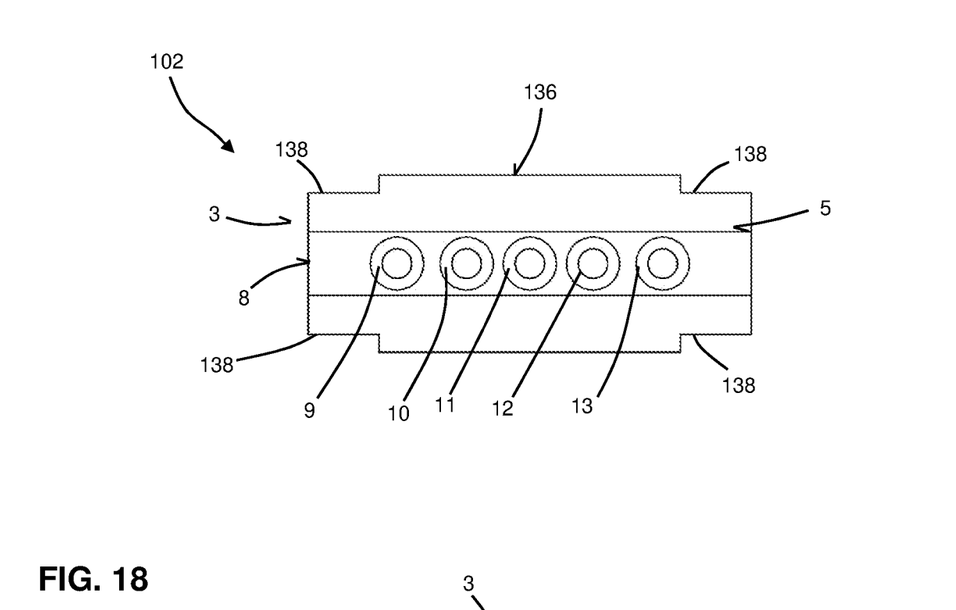
FIG. 18 shows a bottom view of the valve housing shown in FIG. 17.
Figure 19:
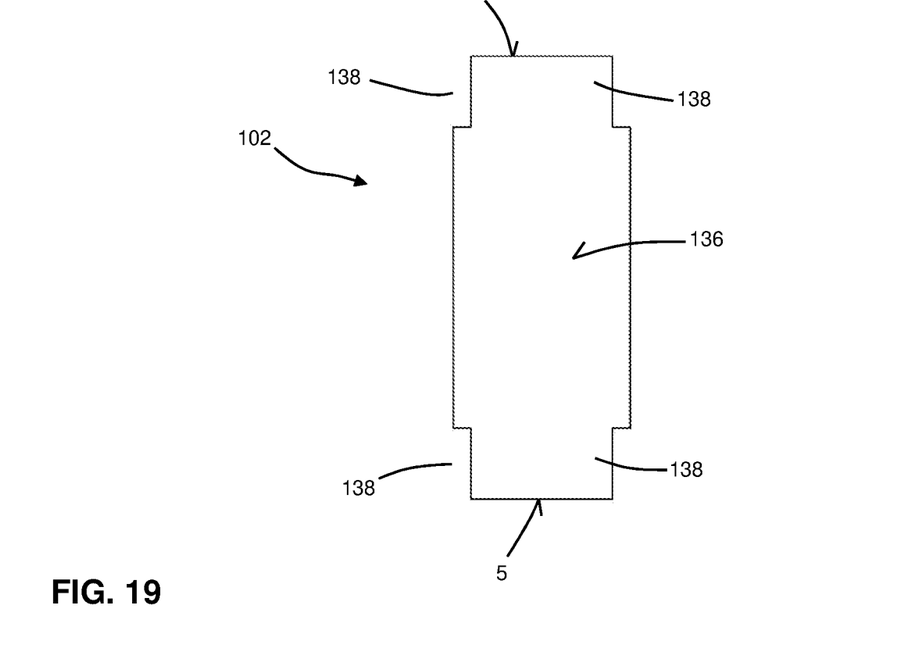
FIG. 19 shows a top view of the valve housing shown in FIG. 17.
Figure 20:
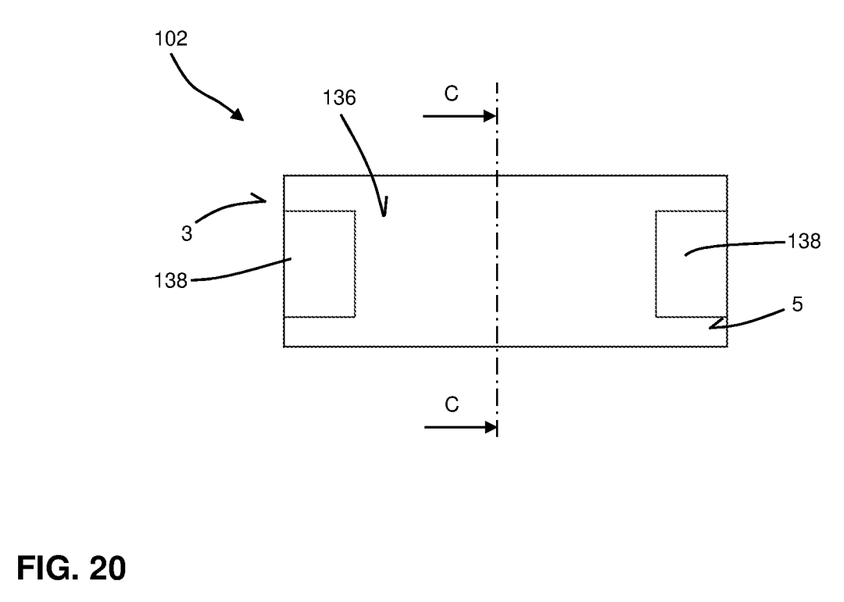
FIG. 20 shows a first side view of the valve housing shown in FIG. 17.
Figure 21:
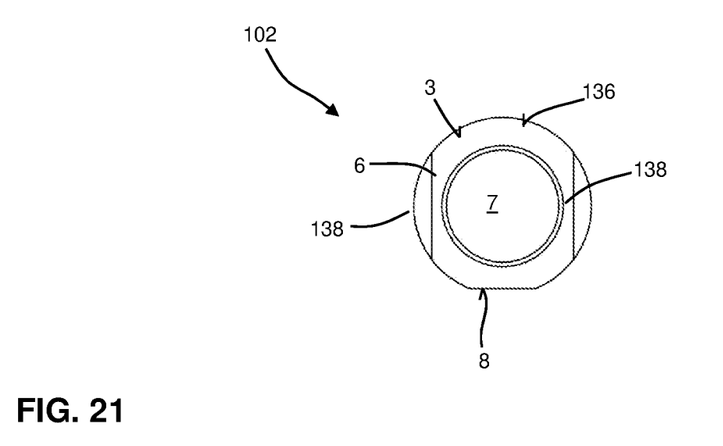
FIG. 21 shows a second side view of the valve housing shown in FIG. 17.
Figure 22:
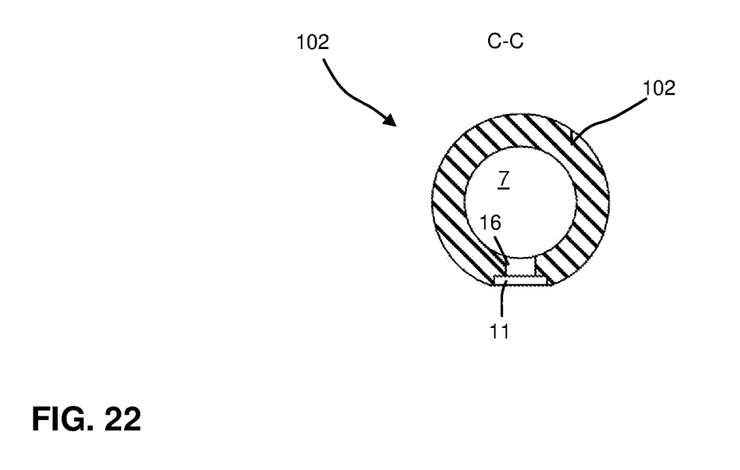
FIG. 22 shows a sectional view along the cut line C-C shown in FIG. 20.
Figure 23:
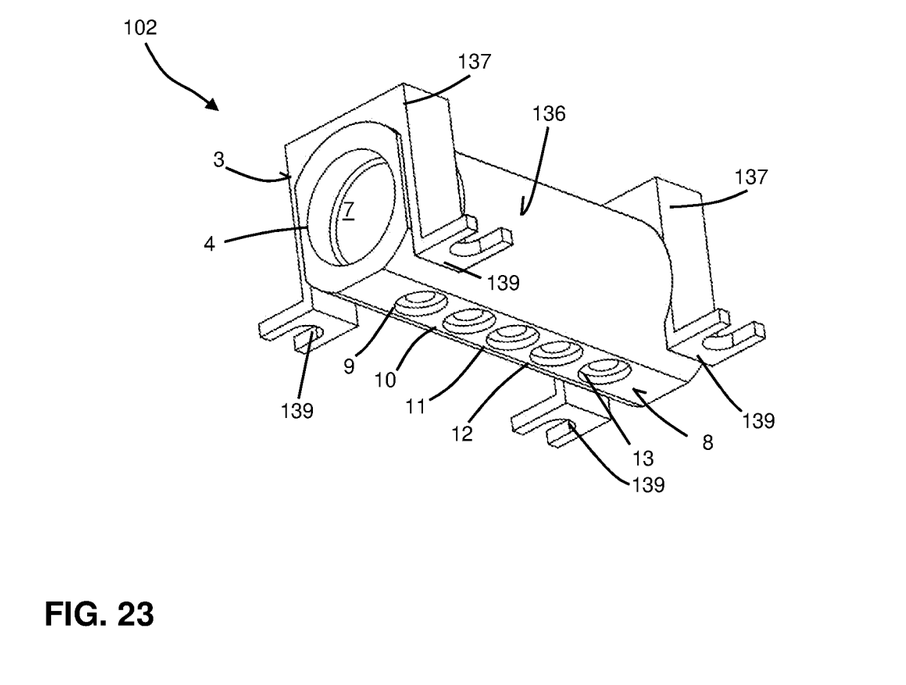
FIG. 23 shows a perspective view of the valve housing shown in FIG. 17 with attachment brackets.

The hydraulic valve system 101 of the second embodiment differs from the hydraulic valve system 1 according to the first embodiment described above only in that no axial flanges are provided on the valve housing 102. Instead, the valve housing 102 has two recesses 138 at each axial end on both sides, which interrupt the outer surface 136, as can be seen in particular in FIGS. 18 and 19. To fix the valve housing 102 to the connection block 19, an attachment bracket 137 is fitted into the two recesses 138 at each axial end of the valve housing 102. As shown in FIG. 23, the attachment brackets 137 each have two protruding noses 139 which extend parallel to the third connection side 8. As can be seen in FIG. 16, the axial noses 139 each serve to accommodate an attachment screw 40, which can be screwed into the corresponding threaded opening 41 of the connection block 19, in order to fix the connection block 19 to the valve housing 102 in a fluid-tight manner.

In order to manufacture the valve housings 2, 102 according to the invention, initially a round steel is provided. For example, the round steel is first cut to the required length or provided as bar material. The round steel is then machined by turning, wherein in particular the first and second connection sides 3 and 5 as well as the through-hole 7 are produced. In addition, other substeps can also be carried out during the turning machining step, such as cutting threads or the like. Then the third connection side 8 is milled. The hydraulic connections 9-13 are inserted during milling or by subsequent drilling. In the case of valve housing 2 according to the first embodiment, the attachment structures 39, which are configured as stepped holes, are also inserted in the first and second axial flanges 37, 38 in this step. Accordingly, the recesses 138 at the axial ends of the valve housing 102 of the second embodiment are made during milling. If required, this can be followed by further processing steps such as honing or surface treatment.

LIST OF REFERENCE CHARACTERS

1,101 hydraulic valve system
2, 102 valve housing
3 first connection side
4 first piston opening
5 second connection side
6 second piston opening
7 through-hole
8 third connection side
9 hydraulic connection
10 hydraulic connection
11 hydraulic connection
12 hydraulic connection
13 hydraulic connection
14 line
15 line
16 line
17 line
18 line
19 connection block
20 hydraulic through-line
21 hydraulic through-line
22 hydraulic through-line
23 hydraulic through-line
24 hydraulic through-line
25 housing side
26 first connection opening
27 first connection opening
28 first connection opening
29 first connection opening
30 first connection opening
31 hole pattern side
32 second connection opening/P-connection
33 second connection opening/T-connection
34 second connection opening/A-connection
35 second connection opening/B-connection
36, 136 outer surface
37 first axial flange
38 second axial flange
39 attachment structure
40 attachment screw
41 threaded opening
42 additional connection opening/P-connection
43 additional connection opening/A-connection
44 additional connection opening/B-connection
45 actuator
46 channel
47 channel
48 channel
137 attachment bracket
138 recess
139 nose

The invention claimed is:
1. A hydraulic valve system, comprising:
a valve housing having a first connection side and a second connection side opposite the first connection side, and the first connection side having a first piston opening and the second connection side having a second piston opening, a through-hole for receiving at least one piston extending from the first piston opening to the second piston opening;
the valve housing having an outer surface extending at least partially between the first connection side and the second connection side, a cross-section perpendicular to a center axis of the through-hole being substantially circular in a region of the outer surface;
the valve housing further having a third connection side with at least three hydraulic connections and lines connecting each of the at least three hydraulic connections to the through-hole, the at least three hydraulic connections being arranged in a row and center points of the hydraulic connections being disposed along a line parallel to the center axis of the through-hole;
a one-piece connection block having a housing side and a hole pattern side opposite the housing side;
at least three first connection openings arranged in a row on the housing side of the connection block, each of the at least three first connection openings positioned and configured to be fluid-tightly connected to a respective one of the at least three hydraulic connections of the valve housing;
a plurality of second connection openings arranged on the hole pattern side in a standardized hole pattern, the standardized hole pattern comprising a hole pattern wherein the holes are not arranged all in a single row and wherein the hole pattern differs from a pattern of the at least three first connection openings; and
at least three hydraulic through-lines each extending from one of the at least three first connection openings to at least one of the plurality of second connection openings, so that the connection block is an adapter which translates the at least three hydraulic connections of the valve housing into the standardized hole pattern.

2. The hydraulic valve system according to claim 1, wherein all hydraulic connections of the valve housing are arranged only on the third connection side.

3. The hydraulic valve system according to claim 1, wherein the valve housing has a substantially cylindrical shape.

4. The hydraulic valve system according to claim 1, wherein the through-hole is stepless.

5. The hydraulic valve system according to claim 1, wherein the valve housing has a first axial flange and a second axial flange, the first connection side being arranged on the first axial flange and the second connection side being arranged on the second axial flange, the first axial flange or the second axial flange having at least one attachment structure for fixing the connection block on the third connection side of the valve housing.

6. The hydraulic valve system according to claim 5, wherein the first axial flange and the second axial flange each have at least one attachment structure for fixing the connection block on the third connection side.

7. The hydraulic valve system according to claim 6, further comprising at least one attachment screw configured to be screwed into a threaded opening of the connection block, the at least one attachment screw fixing the valve housing to the connection block in a clamping and fluid-tight manner via the at least one attachment structure.

8. The hydraulic valve system according to claim 1, further comprising at least one attachment bracket, the valve housing having at least one recess for receiving the at least one attachment bracket for fixing the connection block on the third connection side of the valve housing.

9. The hydraulic valve system according to claim 8, further comprising at least one attachment screw configured to be screwed into a threaded opening of the connection block, the at least one attachment screw fixing the valve housing to the connection block in a clamping and fluid-tight manner via the at least one attachment bracket.

10. The hydraulic valve system according to claim 1, wherein the valve housing is made of one-piece.

11. The hydraulic valve system according to claim 1, wherein the connection block has at least one additional connection opening connected to at least one of the hydraulic through-lines.

12. A method for manufacturing a hydraulic valve system, comprising the steps of:
provi­ding a round steel;
turning the round steel and insertion of a through-hole to form a valve housing having a first connection side and a second connection side opposite the first connection side, the first connection side having a first piston opening and the second connection side having a second piston opening, the through-hole for receiving at least one piston extending from the first piston opening to the second piston opening;
milling the round steel and manufacturing of a third connection side on the valve housing;
insertion of at least three hydraulic connections in the third connection side, the at least three hydraulic connections being arranged in a row and center points of the hydraulic connections being disposed along a line parallel to a center axis of the through-hole; and
providing a one-piece connection block having a housing side and a hole pattern side opposite the housing side; wherein;
at least three first connection openings are arranged in a row on the housing side of the connection block, each of the at least three first connection openings positioned and configured to be fluid-tightly connected to a respective one of the at least three hydraulic connections of the valve housing;
a plurality of second connection openings arranged on the hole pattern side in a standardized hole pattern, the standardized hole pattern comprising a hole pattern wherein the holes are not arranged all in a single row and wherein the hole pattern differs from a pattern of the at least three first connection openings; and
at least three hydraulic through-lines each extending from one of the at least three first connection openings to at least one of the plurality of second connection openings, so that the connection block is an adapter which translates the at least three hydraulic connections of the valve housing into the standardized hole pattern.

13. The method according to claim 12, wherein the round steel is cut to a required length before the providing step.

14. The method according to claim 12, wherein the round steel is provided as bar material.

15. The hydraulic valve system according to claim 1, wherein the standardized hole pattern comprises the holes arranged in a diamond pattern.

16. The hydraulic valve system according to claim 1, wherein the standardized hole pattern further comprises a hole pattern in accordance with ISO 4401.

17. The hydraulic valve system according to claim 16, wherein the hole pattern in accordance with ISO 4401 is an NG6 or NG10 pattern.

18. The hydraulic valve system according to claim 17, wherein the holes are arranged in a triangle pattern.

* * * * *